US006304356B1

(12) United States Patent
Dubos et al.

(10) Patent No.: US 6,304,356 B1
(45) Date of Patent: Oct. 16, 2001

(54) OPTICAL TRANSMITTER FOR REDUCING IMPULSE NOISE IN A FIBER OPTIC LINK

(75) Inventors: Laurent Dubos, Mesnil-Godefroy; François Dumont, Etiolles, both of (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/179,285

(22) Filed: Oct. 27, 1998

(30) Foreign Application Priority Data

Oct. 28, 1997 (FR) .................................................. 97 13510

(51) Int. Cl.⁷ .................................................. H04B 10/04
(52) U.S. Cl. ........................ 359/187; 372/29.021; 372/31
(58) Field of Search .................................... 359/180, 181, 359/182, 183, 184, 185, 186, 187, 188; 372/31

(56) References Cited

U.S. PATENT DOCUMENTS

| 4,611,352 | 9/1986 | Fujito et al. ........................ 455/609 |
| 4,864,649 | * 9/1989 | Tajima et al. ........................ 359/181 |
| 5,402,433 | * 3/1995 | Stiscia .................................... 372/31 |
| 5,488,621 | * 1/1996 | Slawson et al. ........................ 372/31 |
| 5,638,390 | * 6/1997 | Gilliland et al. ................. 372/29.011 |

* cited by examiner

Primary Examiner—Jason Chan
Assistant Examiner—Christina Y. Leung
(74) Attorney, Agent, or Firm—Daniel J. Piotrowski

(57) ABSTRACT

The bias current of the semiconductor laser 4 is adjusted corresponding to the amplitude of the modulation. A transmit signal is presented to the input 1, then amplified by an amplifier 2 and transmitted to the laser 4 via a blocking capacitor 3. A check photodiode 5 is optically coupled to the laser and a set of four resistors 6, 7, 8, 9 forms a bridge. A differential amplifier 10 having its inputs connected to the bridge ensures the supply of bias current through an inductance 11 intended to inhibit the passing of the modulation signal. A peak detector 12 measures the peak amplitude of the signal that drives the laser to check the conductance of a transistor 14 which operates in the variable conductance mode and is branched parallel to the branch 7 of the resistor bridge to modify the balance of the bridge and thus the value of the power transmitted by the laser.

15 Claims, 2 Drawing Sheets

OPTICAL TRANSMITTER FOR REDUCING IMPULSE NOISE IN A FIBER OPTIC LINK

BACKGROUND OF THE INVENTION

The present invention relates to an optical transmitter comprising a semiconductor laser intended to transmit an optical signal, fed with an AC current called modulating current resulting from the modulation of at least one carrier by an analog or digital signal, and with a DC bias current regulated on the basis of a measurement of the light emitted by the laser.

The invention applies to optical links using a laser modulated by a plurality of carriers forming a frequency multiplex.

An optical transmitter as defined in the opening paragraph above is known from U.S. Pat. No. 4,611,352. According to this document, the DC bias current is adjusted to a threshold level thanks to a regulation system which compensates the variations due to temperature and manufacturing tolerance.

SUMMARY OF THE INVENTION

It is an object of the invention to reduce the impulse noise that is likely to affect an optical link in which a semiconductor laser is used.

Transmitters using a semiconductor laser are rendered imperfect by noise signals which may have various origins. The noise in the received signal is more often than not stationary such as is the case with noise of thermal origin or noise resulting from the granular nature of electricity or light (or quantum noise). However, in certain cases the signal may be rendered imperfect by a noise formed by short pulses whose amplitude and frequency are random. This impulse noise is particularly generated when the laser is modulated by a signal that has sufficiently intense peaks for the current passing through the laser at times to adopt a value lower than the value of the threshold current of the laser, or also when the laser is faintly modulated in which case the impulse noise is caused by the back-scattering of the light injected into the optical fiber; the laser in effect becomes unstable when it is exposed to the back-scattered light and this instability results in the appearance of impulse noise affecting the optical power transmitted by the laser.

In the case of a plurality of signals forming a frequency multiplex, the number and/or amplitude of the multiplexed signals may vary in unforeseen manner in the course of time, the multiplex being, for example, formed by signals transmitted by a certain number of users who are connected or disconnected at instants that cannot be foreseen, so that the number of channels forming the multiplex may vary between zero and a large number. The laser is slightly modulated when a small number of users are active simultaneously, the signal then presents impulse noise.

For solving this problem, the transmitter according to the invention includes means for automatically adjusting the point of operation of the laser as a function of the amplitude of the modulating signal, so that the value of the current inside the laser is, on the one hand, under any circumstances, higher than the minimum value necessary to ensure the absence of impulse noise which could occur in case the peak of a strong signal is limited by the laser and, on the other hand, sufficiently low to ensure a sufficient modulation depth at the level of the laser when the modulating signal has a low amplitude.

In a first embodiment, said means are means for modifying the regulated value of the DC bias current as a function of the value of the modulating signal.

Preferably, said means comprise a peak detector detecting the peak value of the modulating signal, and a regulation device for regulating the transmitted average optical power which is slaved to the voltage delivered by the peak detector, which regulation device for regulating the transmitted average optical power advantageously comprising a transistor used in the variable conductance mode is inserted in a branch of a resistor bridge.

Thus, the device is both effective and simple.

A method frequently used for combatting the impulse noise owing to the back-scattering in the fiber consists of modulating the laser with the aid of a signal that has a sufficient amplitude. In these conditions, the wavelength of the light emitted by the laser in effect varies with the timing of the modulation and, consequently, the laser is exposed to a back-scattered light whose wavelength is continually slightly different from the transmitted wavelength. The result is that the laser is less sensitive to back-scattered light. Therefore, it is known to add to the transmit signal a non-modulated sinusoidal wave (or dummy carrier) having for its aim to prevent the modulation depth of the optical signal dropping below a minimum value which is sufficient to avoid the appearance of impulse noise. This method, however, presents a certain number of disadvantages:

the dummy carrier limits the modulation depth available for the transmit signals and produces, via intermodulation with the payload carriers, beats which degrade the quality of the received signal and form error sources in a digital link, the presence of the dummy carrier forms an unwanted load for the laser and aggravates the phenomena of peak limiting and impulse noise caused by the peak limiting.

To avoid these disadvantages, a transmitter comprising a generator of an auxiliary carrier further includes means for slaving the amplitude of this auxiliary carrier to the peak value of said modulating signal.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENTS

Figure 1:
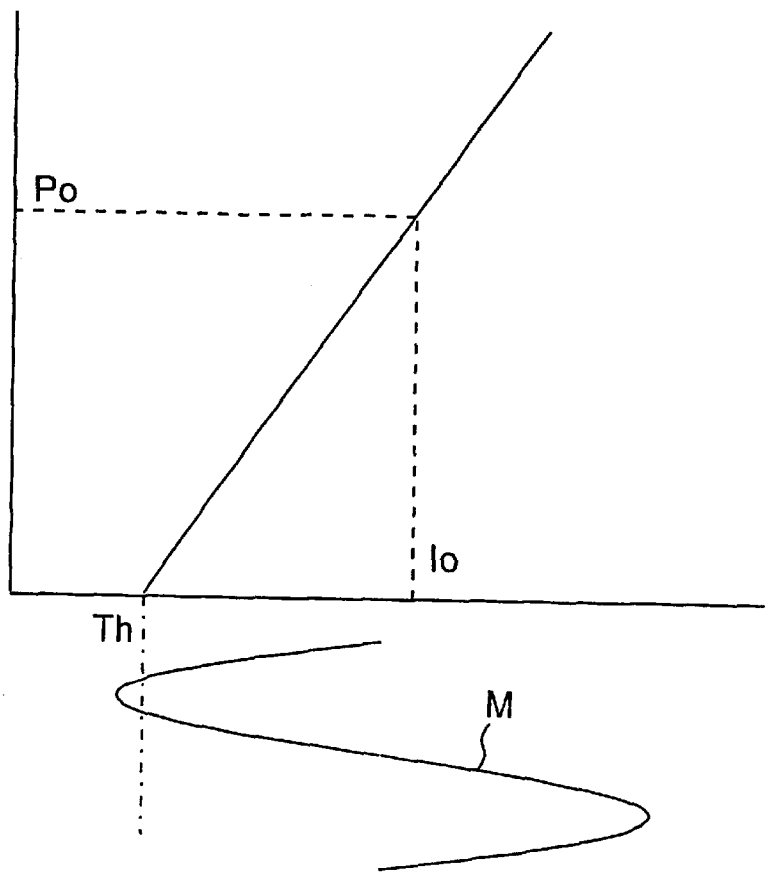
FIG. 1 represents a current-power/power characteristic of a laser.

A laser current/power characteristic is shown in FIG. 1. The y-axis represents the transmitted power and the x-axis the current in the laser. The total current is formed by a DC bias current Io whose value is higher than the threshold value Th on which is superposed an AC current modulating the laser, formed by a plurality of amplitude, frequency or phase-modulated carriers forming a multiplex and shown in simplified manner by the curve M. The negative peaks of the modulating current have an amplitude that is sufficiently high for the current passing through the laser to be at times lower than the threshold current of the laser, which causes the laser to extinguish. This brief extinction is the same as adding a brief positive pulse to the wanted signal.

The invention consists of causing the average power transmitted by the laser to vary as a function of the amplitude of the signals M present on the input of the transmitter, so that the transmitted average optical power is low when the amplitude of the signals present on the input of the transmitter is low, which makes it possible to impose a sufficiently high value for the modulation depth of the optical signal and to avoid the appearance of impulse noise due to the back-scatter into the fiber, even when the transmit signal has its minimum amplitude. On the other hand, when the number of transmit carriers is large and the amplitude of these carriers is high, the control circuit of the transmitted average power biases the laser at its nominal power level, so that the probability of limiting the peaks of the wanted signal is minimized.

Figure 2:
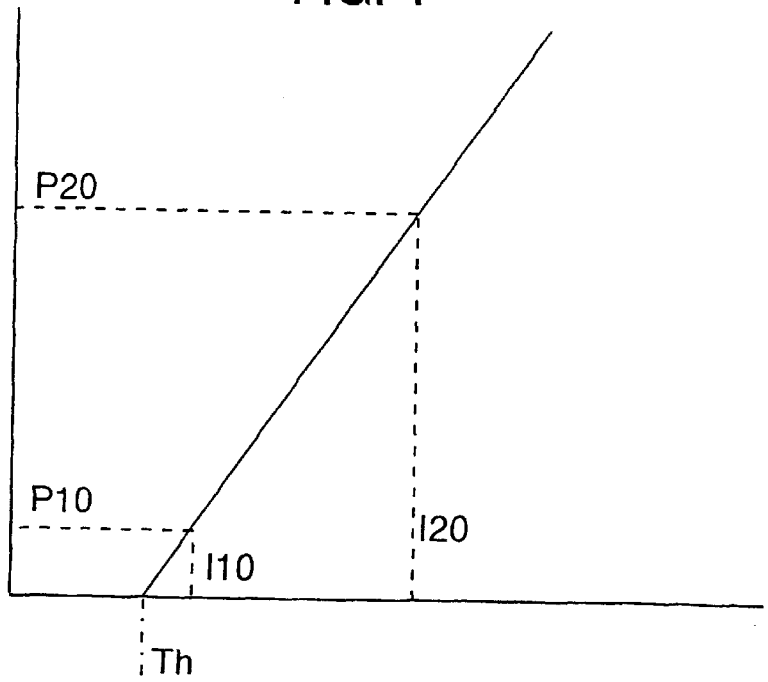
FIG. 2 represents the variation of the average optical power transmitted by the laser as a function of the level of the transmit signal.

FIG. 2 illustrates this variation: when the transmit signal has a low amplitude, the laser is biased by a low-value current I10 so as to ensure a sufficiently high value for the modulation depth so that there is certainly no impulse noise. On the other hand, when the transmit signal has a high amplitude, the laser is biased by a higher current 120. It is true that with a bias current simply having a constant high value, the peak limiting is avoided, but this will have the drawback that a high current would, on the one hand, reduce the useful life of the laser and, on the other hand, would impose a low modulation depth for the laser when the modulating signal has a low amplitude, which in that case would lead to a high impulse noise level due to the back-scattering into the fiber.

Figure 3:
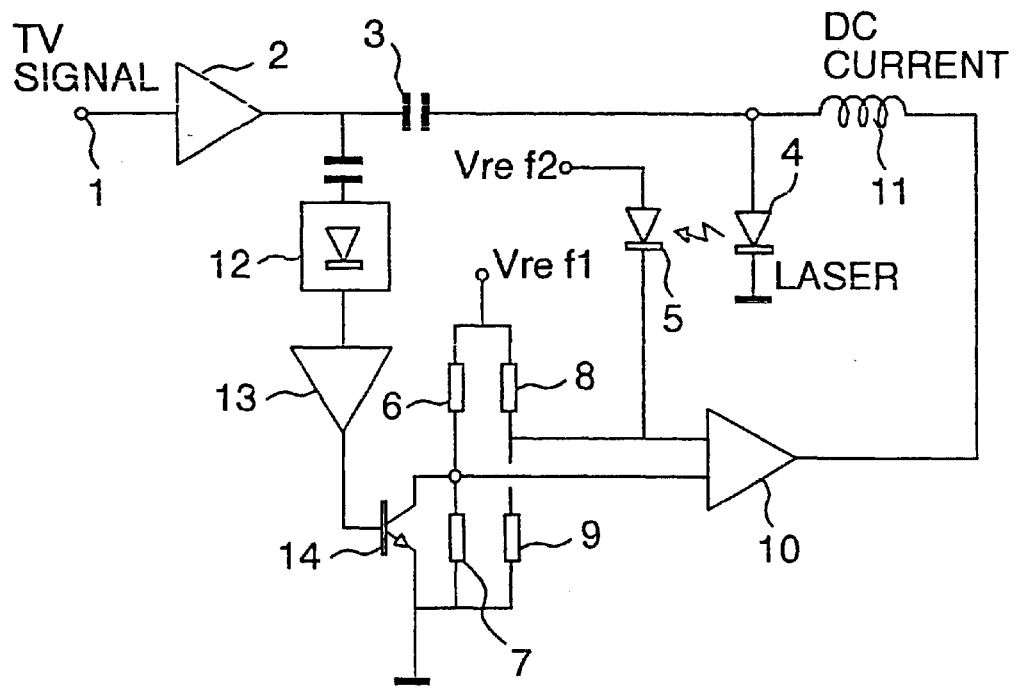
FIG. 3 is an example of a diagram of an optical transmitter circuit according to the invention.

In the transmission circuit of FIG. 3, a signal to be transmitted is present on input 1, then amplified and its impedance is adapted by an amplifier 2, transmitted to the laser 4 via a blocking capacitor 3. The production of the DC bias current is ensured by a stabilizer circuit for stabilizing the transmitted optical power, which circuit is formed by a control photodiode 5 optically coupled to the laser and by a set of 4 resistors 6, 7, 8, 9 forming a bridge. The ohmic values of the resistors forming the bridge are chosen such that the balance of the bridge is realized when the current passing through the photodiode 5 reaches its nominal value, that is to say, for the nominal optical power of the laser. A differential amplifier 10 having its two inputs connected according to a diagonal of the bridge ensures the supply of bias current to the laser through an inductance 11 intended to choke the passage of the AC signal. In practice, the regulation of the transmitted optical power is provided by making the value of at least one of the resistors 6, 7, 8 or 9 vary. On the other hand, the signal on the output of the amplifier 2 is led to a peak detector 12. The output signal of the peak detector 12 is a signal that is proportional to the peak amplitude of the signal driving the laser. This signal is amplified by an amplifier 13 whose output signal checks the conductance of a transistor 14, here of the bipolar type but which may also be of the MOS type, operating in the variable conductance mode and branched off in parallel to the branch 7 of the resistor bridge, so that a variation of the output voltage of the amplifier 13 shifts the balance of the bridge and, consequently, modifies the value of the power transmitted by the laser.

This circuit thus makes it possible to vary the average power transmitted by the laser as a function of the signal level present on the input of the transmitter. The polarity of the voltages, the sign of the gain of the amplifiers and the location of the branch to whose terminals the transistor 14 is connected are chosen in such a way that in the presence of an input signal that has a low or zero amplitude, the laser transmits a low optical power. On the other hand, when the input signal has a maximum amplitude, the circuit imposes the laser to transmit a larger optical power.

It frequently happens that a generator producing an auxiliary sinusoidal wave is included in a transmitter for transmitting service signals which are then transmitted by modulating the frequency of the auxiliary sinusoidal wave. Consequently, there is no objection at all to making the amplitude of the auxiliary carrier vary as a function of the presence and amplitude of the main carriers, provided that there is ensured that the amplitude of the auxiliary carrier remains under any circumstances sufficient for ensuring a correct transmission of the service signals. Similarly, it frequently happens that a circuit capable of detecting the presence and amplitude of the transmitted signals is used in optical transmitters for an automatic gain control, with the aim of avoiding a saturation or a limiting of the peaks of the transmitted signal by the optical transmitter. It is thus possible to obtain an automatic gain control signal whose amplitude varies as a function of the level of the carriers applied to the input, and, based on this signal, to control a controllable gain amplifier inserted between the auxiliary sinusoidal wave generator and the laser.

Figure 4:
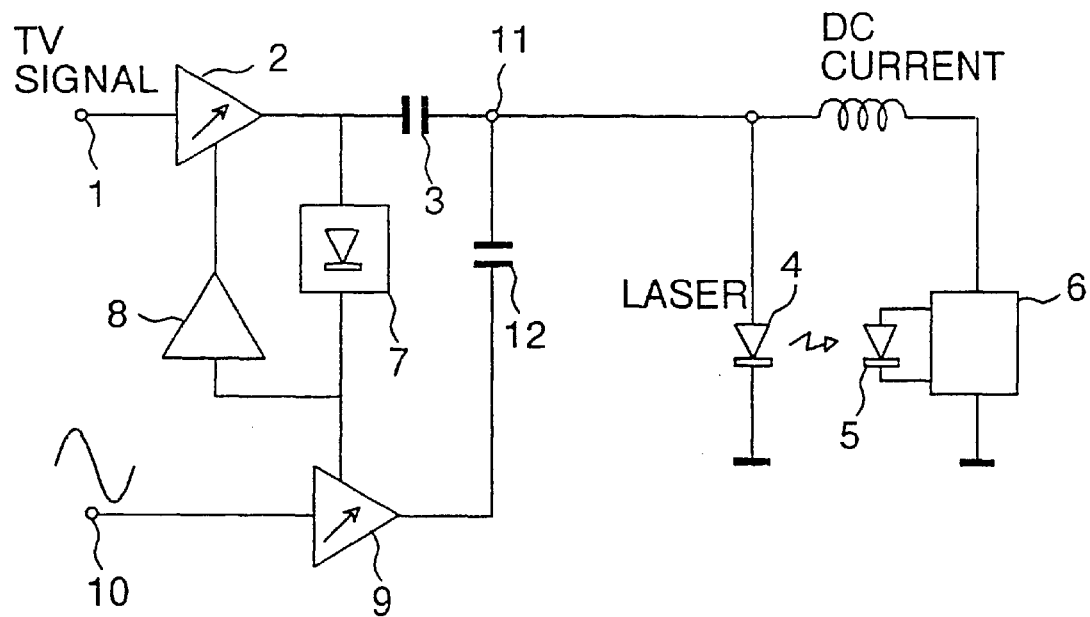
FIG. 4 is a diagram of another example of an optical transmitter circuit according to the invention.

In the transmitter circuit of FIG. 4, the transmit signal is applied to the input 1 then amplified and its impedance is adapted by amplifier means 2, and transmitted to the laser via a blocking capacitor 3. The supply of bias current to the laser is ensured by an ensemble formed by a photodiode 5 and a stabilizer circuit 6 known per se. The transmitter also includes an automatic gain control device known per se, formed by a peak detector 7 whose output voltage controls the gain of the amplifier 2 via an amplifier 8. A known generator (not shown) produces on a terminal 10 a sinusoidal wave whose frequency lies outside the passband of the amplifier 2, possibly modulated by service information signals. The amplitude of this wave is modified by a controllable gain amplifier 9, checked by the circuit 7 which detects the presence and the amplitude of the signals applied to the optical transmitter. The output leaving the amplifier 9 reaches the laser 4 via a blocking capacitor 12. The direction in which the gain of the various elements varies is chosen so that the amplitude of the sinusoidal wave transmitted from the terminal 10 to the laser 4 is maximized when no signal is present on the main input 1 of the optical transmitter. On the other hand, the presence of a signal produces a diminishing of the gain of the amplifier 9 and, consequently, a diminishing of the amplitude of the sinusoidal wave transmitted from the terminal 10 to the laser 4, so that the modulation depth at the level of the laser 4 is under any circumstances at least equal to the minimum required to ensure that there is no impulse noise present on the output of the laser.

If need be, the means described with reference to FIGS. 3 and 4 may be added to each other: it is sufficient, for example, to add the elements 9, 10, 12 of FIG. 4 to the circuit of FIG. 3.

What is claimed is:

1. An optical transmitter, comprising:
   a semiconductor laser operable to transmit an optical signal as a function of an AC modulated current and a DC bias current; and
   an adjustment means for automatically adjusting an average power of said optical signal as a function of a first amplitude of said AC modulated current, wherein an operating current within said laser is equal to or greater than a first level for ensuring an absence of an impulse noise within said optical signal, and said operating current is less than or equal to a second level for ensuring a required modulation depth.

2. The optical transmitter of claim 1, wherein said adjustment means includes a modifying means for modifying a second amplitude of said DC bias current as a function of said first amplitude of said AC modulated current.

3. The optical transmitter of claim 2, wherein said modifying means includes
   a peak detector for detecting a peak amplitude of said AC modulated current, and
   a regulation device for regulating said average power of said optical signal in response to said detection of said peak amplitude of said AC modulated current.

4. The optical transmitter of claim 3, wherein said regulation device includes
   a transistor operating in a variable conductance mode, and
   a resistor bridge including a branch in electrical communication with said transistor.

5. The optical transmitter of claim 1, further comprising:
   a generator operable to provide an auxiliary AC current; and
   a slaving means for slaving a second amplitude of said auxiliary AC current to a peak amplitude of said AC modulation current.

6. An optical transmitter, comprising:
   a semiconductor laser operable to transmit an optical signal as a function of an AC modulated signal and a DC bias signal;
   a photodiode operable to provide a sensing signal as a function of said optical signal; and
   a circuit operable to vary an average power of said optical signal as a function of a first amplitude of said AC modulated signal and a second amplitude of said sensing signal, wherein an operating current within said laser is equal to or greater than a first level for ensuring an absence of an impulse noise within said optical signal, and
   said operating current is less than or equal to a second level for ensuring a required modulation depth.

7. The optical transmitter of claim 6, wherein
said circuit is further operable to provide said DC bias signal to said laser as a function of said first amplitude of said AC modulated signal and said second amplitude of said sensing signal.

8. The optical transmitter of claim 6, wherein
said circuit includes a means for stabilizing said DC bias signal as a function of said first amplitude of said AC modulated signal and said second amplitude of said sensing signal.

9. The optical transmitter of claim 6, wherein
said circuit is further operable to vary a third amplitude of said optical signal as a function of said first amplitude of said AC modulated signal and a fourth amplitude of an auxiliary AC signal.

10. The optical transmitter of claim 6, further comprising:
    a means for varying a third amplitude of said optical signal as a function of said first amplitude of said AC modulated signal and a fourth amplitude of an auxiliary AC signal.

11. An optical transmitter, comprising:
    a semiconductor laser operable to transmit an optical signal as a function of an AC modulated signal and a DC bias signal; and
    a circuit operable to vary an average power of said optical signal as a function of a first amplitude of said AC modulated signal and a second amplitude of said sensing signal, wherein an operating current within said laser is equal to or greater than a first level for ensuring an absence of an impulse noise within said optical signal, and
    said operating current is less than or equal to a second level for ensuring a required modulation depth.

12. The optical transmitter of claim 11, wherein
said circuit is further operable to provide said DC bias signal to said laser as a function of said first amplitude of said AC modulated signal.

13. The optical transmitter of claim 11, wherein
said circuit includes a means for stabilizing said DC bias signal as a function of said AC modulated signal.

14. The optical transmitter of claim 11, wherein
said circuit is further operable to vary a second amplitude of said optical signal as a function of said first amplitude of said AC modulated signal and a third amplitude of an auxiliary AC signal.

15. The optical transmitter of claim 11, further comprising:
    a means for varying a second amplitude of said optical signal as a function of said first amplitude of said AC modulated signal and a third amplitude of an auxiliary AC signal.

* * * * *